Patented July 11, 1944

2,353,482

UNITED STATES PATENT OFFICE

2,353,482

METHOD OF OBTAINING RUBBER FROM CRYPTOSTEGIA

John McGavack, Leonia, N. J., assignor to United States Rubber Company, New York, N. Y., a corporation of New Jersey No Drawing. Application September 1, 1942, Serial No. 456,967

5 Claims. (Cl. 47—10)

This invention relates to a method of obtaining rubber from plants of the genus Cryptostegia, such as *Cryptostegia madagascariensis*, *Cryptostegia grandiflora*, and the hybrid of these two species.

At the present time rubber is commercially obtained from plants, such a guayule, by mechanically crushing and macerating the whole shrub in the presence of water, as by ball-milling the ground-up plant, whereupon the rubber becomes agglomerated and separates from the remaining portions of the plant by floating on the water. The rubber content of Cryptostegia is very seldom more than 1% to 1½% when the whole plant is considered, as against 10% to 20% rubber content in guayule. With such small rubber content of Cryptostegia, it is not commercially feasible to apply the ball-milling recovery process by which rubber is obtained from guayule. It has been previously suggested that rubber-containing plants be disintegrated by grinding or other methods, and the woody portion separated by filtering, classifying, air-blowing, or the like, so that the remainder of the plant which contains most of the rubber can be more successfully processed by a mechanical disintegration in water. By such methods, it is possible to remove at the most 40 to 50% of the woody material, and hence the concentration of rubber in the Cryptostegia so processed could be not much more than 2%, which is still too low a figure to deal with commercially in a mechanical disintegration recovery process. Furthermore, such a method is not particularly applicable to Cryptostegia as there are two rubber-bearing sections of this plant, the bark section and the pith section, and it is extremely difficult to make any mechanical separation of these parts, so that all of the bark and all of the pith containing the rubber portion are removed from the woody fraction.

I have discovered a method of obtaining rubber from Cryptostegia which is quick and economical and which in effect increases the proportion of rubber sufficiently in the parts of the plant to be treated so that these plant portions may be commercially mechanically crushed and macerated in the presence of water, as by ball-milling, to recover by flotation the agglomerated rubber in a manner similar to the recovery of rubber from guayule.

In carrying out my process for obtaining rubber from Cryptostegia, the ends of the plants are clipped off a short distance, for example, about ¼" to ½" on the first day, the plant is permitted to rest, and then the plants are clipped back a short distance from the previously cut ends, for example, about ¼" to ½". This resting and cutting may be repeated any desired number of times with varying rest periods from a few hours to one or more days, depending on the total number of clippings that have been made. The resting of the plant after clipping gives time for the latex to flow to the cut end and flow out or bleed. Some of the latex will flow down the surface of the plant. In this manner the rubber will be concentrated very close to the cut ends and the subsequently clipped sections will have sufficiently high rubber content to permit effective mechanical recovery of the rubber without difficulty. In extracting the rubber from the clipped sections, the sections may be partially dried, disintegrated with any grinding machine, and then ball-milled in water, usually for six to sixteen hours, after which the rubber agglomerates in balls or clots which float to the surface and may be skimmed off and dried. It is sometimes desirable to add a small amount of fixed alkali to the water in the ball-milling procedure. The original clipped end sections with the normal rubber content of around 1% may be mixed with the subsequently cut sections of considerably higher content in the mechanical rubber-extracting process, or the subsequently cut sections of higher rubber content may be used alone for extracting the rubber, discarding the original ends.

The following examples illustrate the increased rubber content of the cuttings which are the result of the alternate resting periods and clippings of the present invention, the rubber contents of the various clippings being determined mechanically by ball-milling in water for sixteen hours:

Example I

Four to six year old Cryptostegia plants were clipped each day for fourteen days, and it was found that the rubber content was considerably increased for the second, third, and fourth clippings after the original end had been cut off and that even up to the thirteenth day the rubber content of the clippings was greater than the rubber content of the original plant, or original end clippings. The rubber content of the original clipping on the first day was 1%, whereas the rubber contents of the subsequent days were as follows: second day—14%, third day—10%, fourth day—4%, fifth day—1.5%, sixth day—2%, seventh day—2.5%, eighth day—2%, ninth day—1.5%, tenth day—2%, eleventh day—1.5%, twelfth day—2%, thirteenth day—2%, fourteenth day—1%.

The rubber was extracted from the first ten days' clippings by partially drying, grinding, and ball-milling in water. The rubber agglomerated into balls which were removed from the water, and dried. The rubber was compounded and vulcanized in the conventional manner and gave an excellent sheet of rubber.

*Example II*

In this case the plants were clipped on the first, third, sixth and eighth day to give longer periods of rest between clippings with a corresponding greater increase in rubber content over an extended period of time. In this case the rubber content of the original cut ends, i. e. the first day clippings, was .6%, the third day clippings 9.5%, the sixth day clippings 3.7%, and the eighth day clippings 8.5%.

*Example III*

In this case the Cryptostegia plants were clipped three successive days and then rested four days, and then clipped three more days with the following results: The rubber content of the original clipped ends on the first day was .2%, the rubber content of the clippings on the second day was 11%, on the third day 2%, on the seventh day 4%, on the eighth day 2%, and on the ninth day 2%.

It may be seen from the above that the percent rubber in the cut ends of the plant may be substantially increased so that the rubber may be readily extracted commercially from the clipped sections in the conventional manner of extracting rubber from wild plants and shrubs, such as guayule. The rubber of course may also be extracted from the clippings by solvent processes but such processes are not as satisfactory as simply crushing and ball-milling with water. In any case, the present invention will substantially increase the rubber content of the plant parts from which the rubber is to be extracted so that regardless of the method of finally extracting the rubber, the new method of treatment of the plants by resting and clipping is a decided improvement over any prior suggestions for dealing with the Cryptostegia plant.

In view of the many changes and modifications that may be made without departing from the principles underlying the invention, reference should be made to the appended claims for an understanding of the scope of the protection afforded the invention.

Having thus described my invention, what I claim and desire to protect by Letters Patents is:

1. Method of obtaining rubber from Cryptostegia which comprises clipping sections of the plant a short distance from the ends, allowing the plant to rest, then clipping back a short distance from the previously clipped ends, and extracting rubber from the clipped sections.

2. Method of obtaining rubber from Cryptostegia which comprises clipping a short distance from the ends of sections of the plant which have previously been clipped allowing the plant to rest, then clipping back a short distance from the thus clipped ends, and extracting rubber from the clipped sections.

3. Method of obtaining rubber from Cryptostegia which comprises clipping sections of the plant a short distance from the ends, allowing the plant to rest at least a day, then clipping back a short distance from the previously clipped ends, and extracting rubber from the clipped sections.

4. Method of obtaining rubber from Cryptostegia which comprises clipping sections of the plant a short distance from the ends, allowing the plant to rest until the concentration of rubber in the remaining ends is substantially greater than the concentration of rubber in the clipped end sections, then clipping back a short distance from the previously clipped ends, and extracting rubber from the clipped sections.

5. Method of obtaining rubber from Cryptostegia which comprises clipping sections of the plant a short distance from the ends, allowing the plant to rest, then clipping back a short distance from the previously clipped ends, and mechanically extracting the rubber from the clipped sections by macerating in an aqueous medium.

JOHN McGAVACK.